J. G. MATTHEWS.
PROCESS OF MANUFACTURING BORING OR MILLING CUTTERS.
APPLICATION FILED NOV. 13, 1908.

949,377. Patented Feb. 15, 1910.

Witnesses
Clora E. Braden
Gertrude Talleman

Inventor
John G. Matthews
By Chappell Earl
Attorneys

UNITED STATES PATENT OFFICE.

JOHN G. MATTHEWS, OF OBERLIN, OHIO.

PROCESS OF MANUFACTURING BORING OR MILLING CUTTERS.

949,377.     Specification of Letters Patent.     Patented Feb. 15, 1910.

Application filed November 13, 1908. Serial No. 462,441.

*To all whom it may concern:*

Be it known that I, JOHN G. MATTHEWS, a citizen of the United States, residing at Oberlin, Lorain county, Ohio, have invented certain new and useful Improvements in Processes for Manufacturing Boring or Milling Cutters, of which the following is a specification.

This invention relates to improvements in processes for manufacturing boring or milling cutters.

The main object of this invention is to provide an improved process for manufacturing boring or milling cutters by means of which very high-class tools may be manufactured with comparative economy.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which,—

Figure 1:
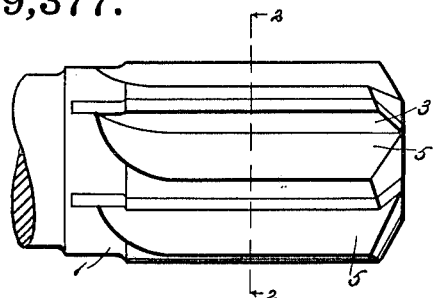
Figure 2:
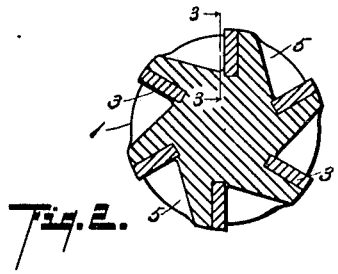
Figure 3:
Figure 4:
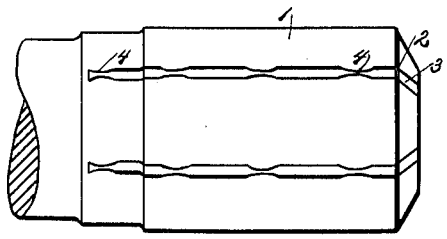
Figure 5:
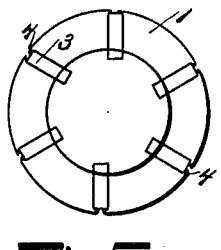
Figure 11:
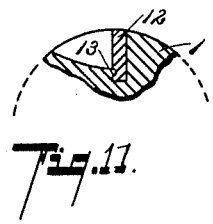
Figure 6:
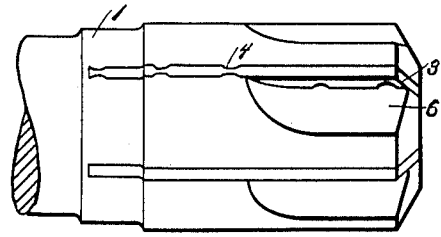
Figure 7:
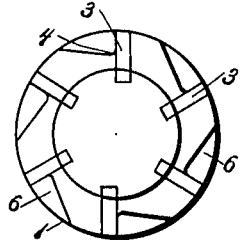
Figure 12:
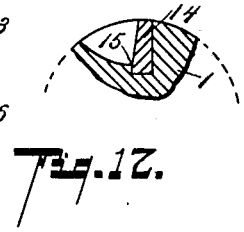
Figure 9:
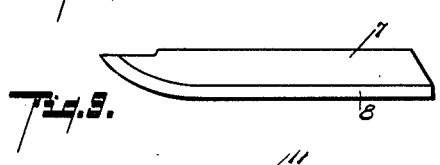
Figure 10:
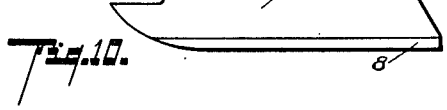
Figure 8:
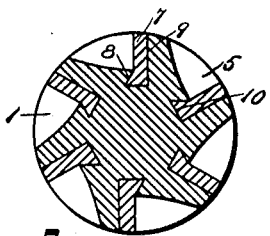

Figure 1 is a detail side elevation of a boring cutter manufactured according to my improved process. Fig. 2 is a cross section thereof, taken on a line corresponding to line 2—2 of Fig. 1. Fig. 3 is a detail longitudinal section, taken on a line corresponding to line 3—3 of Fig. 2. Fig. 4 is a detail side elevation, illustrating one of the steps of my improved process, the cutting blades having been inserted and secured preparatory for the brazing process. Fig. 5 is an end view of the structure appearing in Fig. 4. Fig. 6 is a side elevation of a modified form of my improved process, portions of the body being cut away before the brazing step to permit the more effective hardening of portions of the blades. Fig. 7 is an end view of the structure appearing in Fig. 6. Fig. 8 is a cross section of a modified form of blade, the inner edges of the blades being enlarged and the seats in the body formed accordingly for holding them in place. Figs. 9 and 10 are side elevations of the blades shaped in cross section like those appearing in Fig. 8, the rib or dovetailed portion in Fig. 9 extending entirely to the inner end of the blade. Figs. 11 and 12 are detail cross sections of further modifications in the form of the blades.

In the drawing, the sectional views are taken looking in the direction of the little arrows at the ends of the section lines, and similar numerals of reference refer to similar parts throughout the several views.

Referring to the drawing, I will describe my invention, stating the steps as they are preferably taken by me in carrying out my improved process, although I desire to here remark that certain steps can be omitted entirely, or the order of certain operations varied, and still very satisfactory results be secured.

In carrying out my improved process, I ordinarily rough out the body 1 of the tool to a size somewhat larger than the size of the completed tool. In this body I cut slot-like seats 2 for the blades, which operations I designate as the first step. The cutting blades 3, which are preferably formed of air-hardening or high-speed steel, are inserted into these grooves and the metal upset or overlapped onto the outer edges or surfaces of the blades, as at 4, thus positively securing or clamping the blades in their seats for the brazing operation. I preferably overlap the metal on the blades at their ends and at intervals between the ends, so that they are securely retained to prevent their warping during the brazing process. These operations I designate as the second step. I then braze the blades of the body by heating to the proper temperature for hardening the blades, applying a suitable spelter, preferably a copper, to form a bond between the blades and the body and then cooling for hardening. This cooling operation sets the spelter or solder and forms a secure bond between the blades and the body, and, at the same time, the blades are suitably hardened. The blades being clamped into the seats by overlapping the metal thereon, are securely retained during the cooling operation, so that they do not warp or loosen in the seats. The cooling, by thus securing the blades, can be done by plunging into a suitable bath, or by any other hardening or tempering means. These operations I designate herein as the third step. After the brazing, I preferably rough grind the tool to a size slightly larger than the finished tool, which cleans off the spelter and reduces the tool to a proper form for conveniently performing the succeeding operations. This operation I designate as the fourth step. I then cut or mill the grooves or flutes 5 in front of the blades, the grooves being preferably cut nearly to the bottom of the blades and to their inner ends, a sufficient amount of metal being left at the rear ends and bottoms of the blades to cover the joint of the blades with the body. This step I designate herein as the fifth step. After rough cutting the grooves, I grind the faces of the blades and polish the grooves, and I designate these operations as the sixth step. I then finish the tool by grinding it to size and polishing, if desired, and these operations I designate herein as the seventh step. By following out this process of manufacture, a very satisfactory tool may be produced, the cutting blades being thus secured are, in effect, an integral part of the body, and I thus obtain a tool having high-speed or air-hardening steel for the cutting blades, and a body of less expensive and rough metal, which effectively supports the same, and, at the same time, can be easily worked during the process of manufacture. Ordinary machine steel is entirely satisfactory for the body.

In the modified process, one step of which is illustrated in Fig. 6, the body is partially cut away at the ends of the blades, as 6,—that is, the flutes or grooves 5 are partially formed before the brazing step. The advantage of this is that the ends of the blades are more effectively exposed for the hardening step. After the hardening step, the grooves or flutes 5 are milled or cut, as above described.

In the modified construction shown in Figs. 8, 9 and 10, the blades 7 are provided with enlargements 8 on their lower edges. The metal is upset or swaged over these enlargements, as at 9, so that it overlaps the same, thus positively clamping the blades in their seats. When manufacturing tools according to this modification, the flutes 5 may be cut before the brazing process. By forming the blades as shown in Fig. 10, the seats 10 for the blades 7 may be made in the dove-tailed shape and the blades inserted by slipping endwise into the seats, as the enlargement or rib 8 does not extend up onto the curved end of the blade 11.

In the modification shown in Fig. 11, the blade 12 is provided with a longitudinal groove 13, thus forming an enlargement or flange on the lower edge of the blade, the metal of the body being forced into this groove or lapped over this flange, thus effectively securing the blade for the brazing operation.

In the modification shown in Fig. 12, the blade 14 is wedge-shaped in cross section, and the seat is suitably conformed thereto, or the metal is overlapped upon the same at 15, thus retaining the blade.

Other and various modifications will readily occur to those skilled in this art. I have illustrated these modifications as they will readily suggest various means of accomplishing substantially the same end.

Having thus described my improved process of manufacturing reamers or milling tools in detail in the form preferred by me, I desire to state that it can be considerably varied without departing from my invention.

Having thus described my invention, what I claim as new and desire to secure by Letters Patent is:

1. The process of manufacturing a reamer or milling tool consisting of first, forming the body to a size exceeding that of the finished tool and cutting slot-like blade seats therein; second, placing cutting blades of high-speed or air-hardening steel in said seats and upsetting the metal over the outer edges of the blades to secure the blades in said seats; third, brazing by heating the body with the blades therein to a proper temperature for hardening the blades and applying a suitable spelter to form a bond between the blades and the body and cooling for hardening; fourth, grinding and finishing the tool.

2. The process of manufacturing a reamer or milling tool, consisting of first, forming the body and cutting slot-like seats therein; second, placing cutting blades of high-speed or air-hardening steel in said seats and overlapping portions of said blades with the metal of said body by upsetting the same to retain the blades in said seats; third, brazing by heating the body with the blades therein to a proper temperature for hardening the blades and applying a suitable spelter to form a bond between the blades and the body and cooling for hardening.

In witness whereof, I have hereunto set my hand and seal in the presence of two witnesses.

JOHN G. MATTHEWS. [L. S.]

Witnesses:
A. M. LOVELAND,
M. B. LAIRD.